United States Patent
Adler et al.

[15] 3,642,153
[45] Feb. 15, 1972

[54] ROTARY PLOW FEEDER

[72] Inventors: Imre Adler, Verona; Louis Felts, Butler; Nicholas S. Klucheff, Brick Town, all of N.J.

[73] Assignee: Hewitt-Robins Incorporated, Stamford, Conn.

[22] Filed: Apr. 24, 1970

[21] Appl. No.: 31,664

[52] U.S. Cl................................214/17 DA, 198/96, 198/212, 214/15 E
[51] Int. Cl..................................................B65g 65/48
[58] Field of Search.................214/10, 15 E, 17 DA; 198/96, 198/101, 126, 212

[56] References Cited

UNITED STATES PATENTS

| | | | |
|---|---|---|---|
| 2,892,552 | 6/1959 | Van Zyp | 214/17 DA |
| 3,455,467 | 7/1969 | Martini et al. | 214/15 E |

*Primary Examiner*—Robert G. Sheridan
*Attorney*—John D. Boos and John D. Lister

[57] ABSTRACT

A discharge system for transferring bulk material from cargo holds onto a discharge conveyor of a self-unloading vessel comprises inclined storage shelves, which extend beneath and receive bulk material from the cargo holds, and inclined rotary plow feeders which traverse the length of the shelves to reclaim bulk material from the shelves and deposit the material onto the discharge conveyor. The rotary plow feeders are each driven by a first drive system about a central axis of rotation to reclaim material from the inclined shelves and the feeders are each provided with a second drive system for pivoting the hub of the feeder about an eccentric axis to commence, adjust, or terminate the feed of material from the shelves to the conveyor. With the rotary plow feeders in their retracted positions the feeders can be relocated along the shelves, as desired, even with material on the shelves. The hub of each feeder includes a ring gear normally driven about its central axis by an internal pinion gear for reclaiming and an annular ring gear housing that is pivoted about an eccentric axis of the feeder, coinciding with the axis of the pinion, to adjust the depth that the feeder blades extend into the bulk material on the shelves.

18 Claims, 6 Drawing Figures

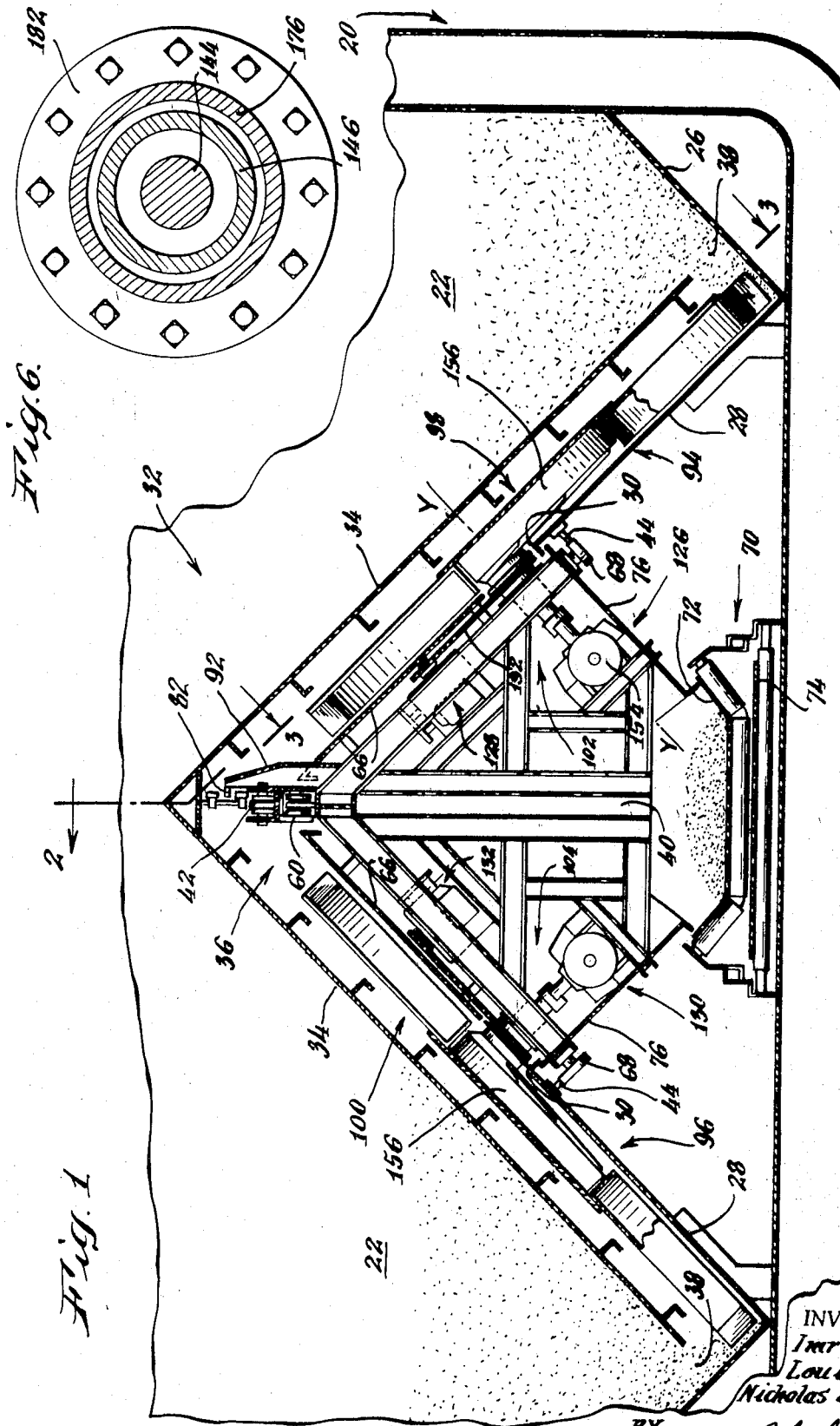

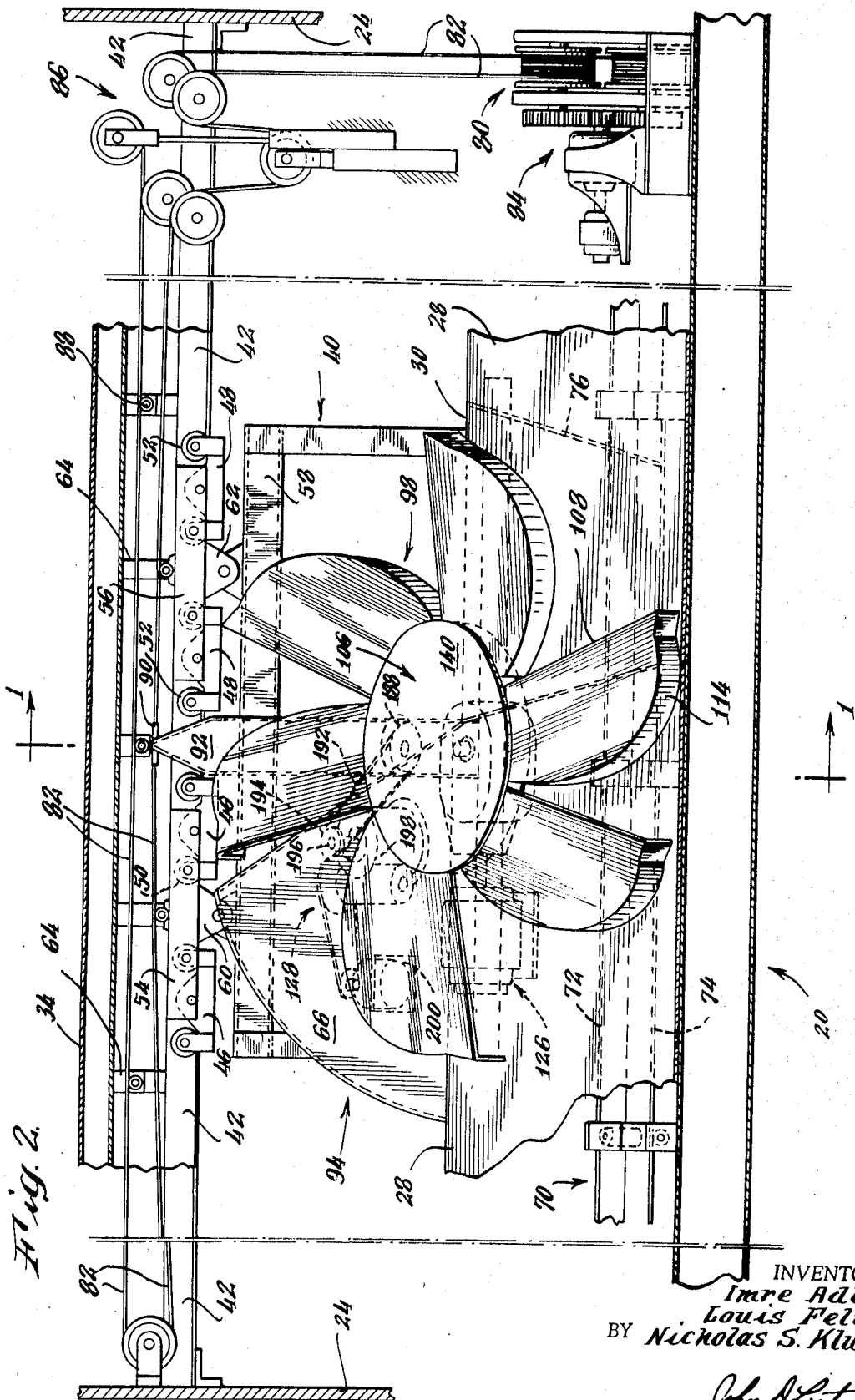

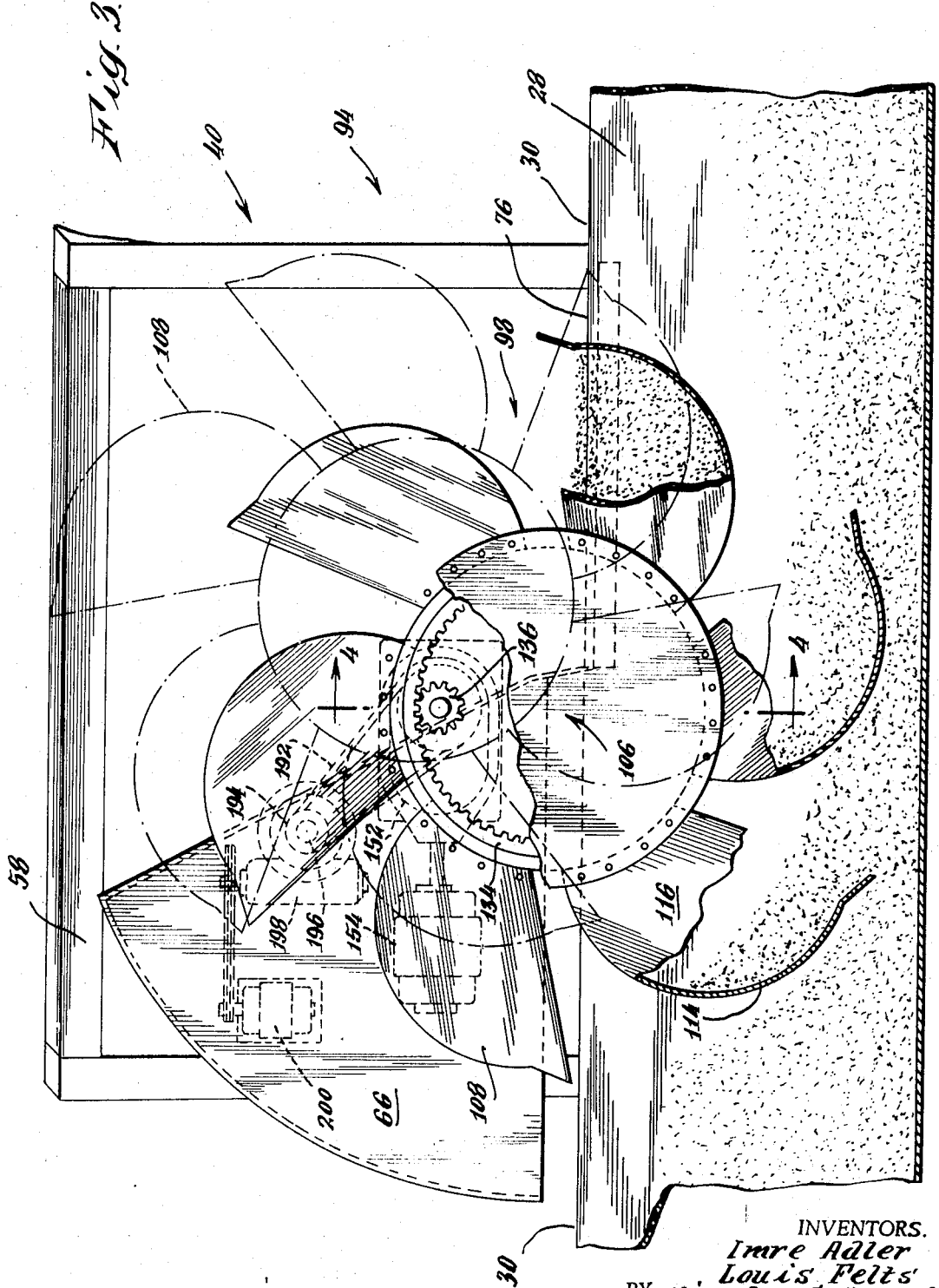

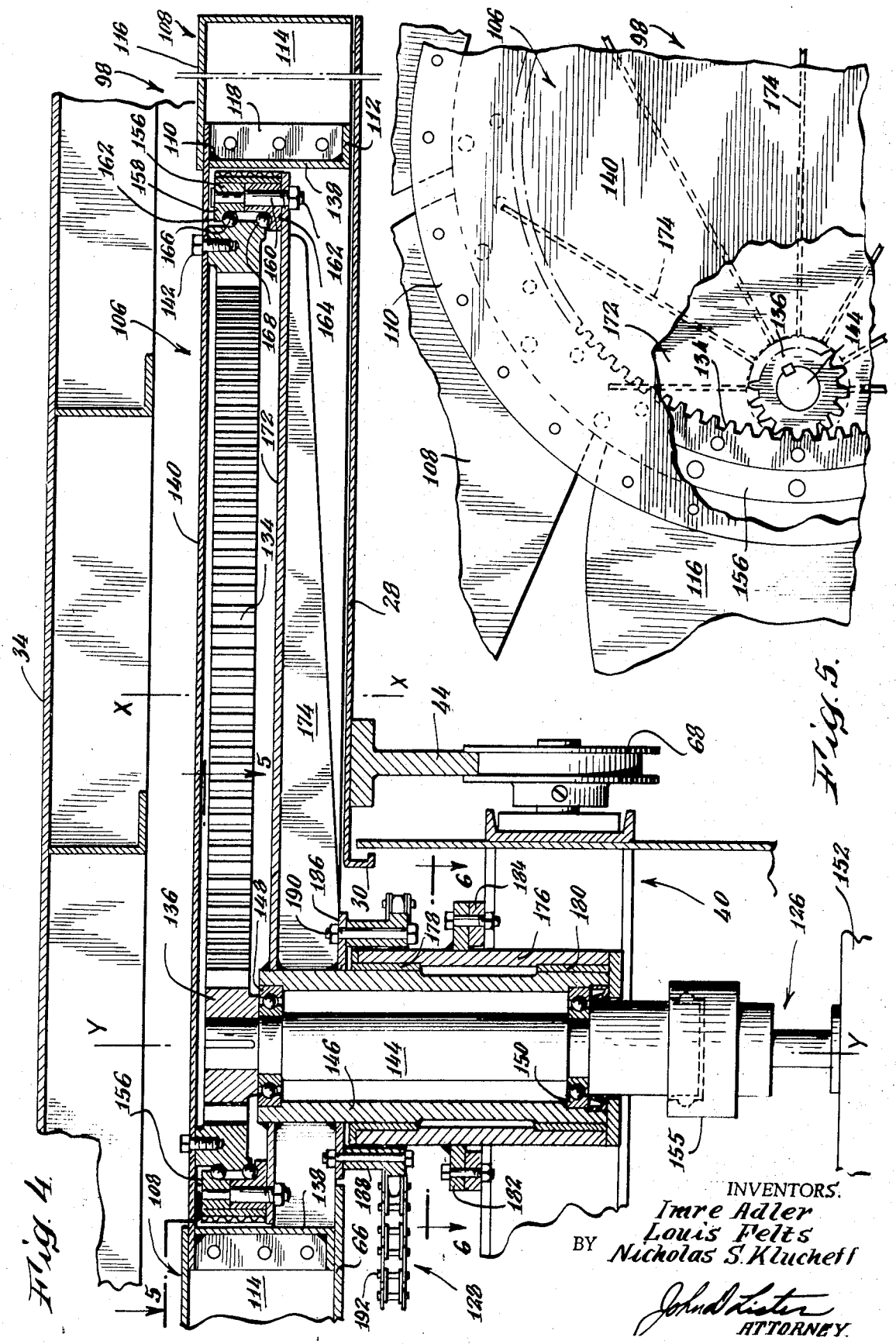

3,642,153

ROTARY PLOW FEEDER

BRIEF DESCRIPTION OF THE INVENTION

This invention is generally related to rotary plow feeders and, in particular, to an improved rotary plow feeder which can be pivoted about an eccentric axis to adjust the depth that the feeder blades extend into the material being reclaimed.

Rotary plow feeders of the prior art have been provided with retractable blades (e.g., Martini et al., No. 3,455,467, issued July 15, 1969) and with mechanisms for adjusting the plow feeders relative to shelf on which they operate (e.g., British Pat. Nos. 998,303, July 14, 1965; No. 1,014,201, Dec. 22, 1965; and French Pat. No. 722,514, Mar. 17, 1932). However, none of the above-mentioned disclosures utilize or suggest a mechanism of the type or character set forth in the present application for both rotating the rotary plow feeder about a central axis to effect reclaiming and pivoting the rotary plow feeder about an eccentric axis to commence, adjust, or terminate the feed of bulk material from a storage shelf to a conveyor or the like.

The rotary plow feeder assembly of the present invention is constructed so that the carriage can be readily moved along the length of a storage shelf to any desired location without the plow feeder performing a reclaiming function.

The rotary plow feeder assembly of the present invention provides a mechanism for pivoting the rotor, alone, about an eccentric axis to commence, adjust, or terminate the feed of bulk material from a storage shelf.

Due to the unique, eccentric rotor drives for effecting reclaiming by a rotor and the adjusting of the rotor relative to a shelf, the diameter of the plow feeder rotor can be reduced with a resulting saving in the space required for the feeder assembly.

With the eccentric drive of the present invention the input required to provide a specified torque about the axis of rotation of the rotary plow feeder is reduced when compared to the conventional drive wherein the drive shaft coincides with the axis of rotation of the rotary plow feeder.

Briefly, the preferred form of the invention comprises a rotary plow feeder wherein the hub of the rotor includes an internal ring gear that is driven by a pinion gear offset with respect to the axis of rotation of the ring gear. The ring gear is rotatably supported within an annular housing having a separate drive that pivots the housing about the axis of rotation of the pinion gear. Thus, when the annular housing is pivoted about the last-mentioned axis, which is eccentrically located with regard to the centerline and axis of rotation of the ring gear, the rotor is adjusted relative to the storage shelf and bulk material on the shelf to commence, adjust, or terminate the reclaiming of material from the shelf.

The above objects and advantages of the present invention will become more apparent and other objects and advantages of the present invention will become apparent from the following detailed description when taken in conjunction with the accompanying drawings wherein:

FIG. 1 is an end view of a preferred form of the invention with portions thereof in cross section and illustrating the invention within the hold of a vessel that is shown in partial transverse cross section;

FIG. 2 is a fragmentary side view of the rotary plow feeder taken substantially along lines 2—2 of FIG. 1 and illustrating the overhead carriage suspension and drive;

FIG. 3 is an enlarged view taken substantially along lines 3—3 of FIG. 2 with portions broken away for illustrative purposes and showing the rotor fully extended in solid line and retracted in dashed line;

FIG. 4 is an enlarged cross-sectional view of the rotor hub and part of the drive assembly taken along lines 4—4 of FIG. 3;

FIG. 5 is a view taken along lines 5—5 of FIG. 4 with portions thereof broken away to better illustrate the ring and pinion drive in plan; and FIG. 6 is a cross-sectional view of the drive assembly taken substantially along lines 6—6 of FIG. 4.

DETAILED DESCRIPTION OF THE INVENTION

Referring now to the drawings and particularly to FIGS. 1 and 2 of the drawings, a preferred embodiment of the invention is shown in the hold of a self-unloading vessel 20, such as the one illustrated in the D. H. Martini et al. U.S. Pat. No. 3,455,467, issued July 15, 1969. Of course, it is to be understood that the rotary plow feeder of the present invention is not restricted in its use to self-unloading vessels but can be used in various bulk handling systems where the material is reclaimed from a storage shelf or the like.

The self-unloading vessel 20 has a storage area made up of a series of cargo holds 22 formed by a series transverse bulkheads 24 (only the forward and aft bulkheads being shown) and sidewalls 26. As shown in FIG. 1, the lower portions of cargo hold sidewalls 26 are inclined downwardly from the sides of the vessel toward to center of the vessel and a pair of upwardly inclined storage shelves 28 form a juncture with the bottom of the sidewalls. These storage shelves 28 are continuous and extend for substantially the entire length of the storage area with the upper downturned edges 30 of the shelves being spaced apart so as to define a horizontal slot-type opening which also extends for substantially the entire length of the storage area. A double pitched roof 32 is centered over the slot-type opening with the inclined roof sections 34 being spaced above shelves 28, thereby forming a longitudinal tunnel 36 at the bottom of the cargo holds. The roof sections 34 are suitably braced with each inclined roof section 34 being substantially parallel to one of the storage shelves 28 and spaced from the sloping sidewalls 26 of the cargo hold so as to define an inclined slot-type opening 38 extending along the entire length of the storage area. These slots enable the bulk material stored in the cargo holds to enter the tunnel 36 and come to rest on the storage shelves 28. The size of these inclined slot openings 38 and the width of the storage shelves are so related to the angle of repose of the stored bulk material that the material comes to rest on the storage shelves 28 as a sloping pile of material well below the upper edges 30 of the shelves.

A suspended carriage 40 for the plow mechanisms is carried on an overhead rail 42, that is secured to the apex of the roof 32 by conventional support members 64, and parallel guide rails 44, that are welded or otherwise mounted on the undersides of shelves 28. As best shown in FIGS. 1 and 2, the carriage 40 is provided with two pair of upwardly opening channel shaped members 46, 48 which straddle the rail and carry rollers 50, 52, respectively, that ride on horizontally extending base flanges of the rail assembly. Members 46, 48 are pivotally carried on frame members 54, 56 which in turn are pivotally secured to I-beam 58 of the carriage though mating lug assemblies 60, 62. With this construction the rail 42 can be suspended from above as shown and the pivotal mountings enable the carriage to negotiate any irregularities between rail sections.

Pairs of guide rollers 68 are provided on each side of the carriage frame adjacent the ends of the carriage. These rollers 68 cooperate with rails 44 to maintain the carriage in proper alignment.

Located below the horizontal slot-type opening defined between shelf edges 30 is a conventional discharge conveyor 70 having a conveying reach 72 and a return reach 74. The carriage 40 straddles the conveying reach 72 and is provided with guide chutes 76, which open over the discharge conveyor, to direct material which is removed from the shelves 28 by the plow mechanisms down onto conveying reach 72 of the conveyor. As best shown in FIG. 1, the chutes 76 slope from the shelves 28 down and toward the center of the conveyor with the upper ends of the chutes projecting beneath the downturned edges or flanges 30 of the shelves 28 and the lower ends of the chutes terminating over the conveying reach 72 of the conveyor assembly.

The carriage is driven by a conventional rope or cable haulage drive system 80. The system comprises a cable 82, at least one drive motor and double drum cable drive assembly 84 for driving the cable in either direction, a conventional cable takeup assembly 86, guide and suspension rollers 88, which are carried on rail supports 64, and a conventional mounting means 90, such as shackle end turnbuckles for uniting the cable with the carriage. As best shown in FIGS. 1 and 2, the turnbuckles 90 are attached to upper end of the vertical I-beam 92 of the carriage.

While the carriage is shown suspended from an overhead track, it is to be understood that the carriage can be mounted on tracks in a manner like or similar to that illustrated in FIG. 2 of U.S. Pat. No. 3,455,467 which was cited above. Furthermore, although the carriage is shown with a rope haulage drive, any conventional means such as motorized drive wheels, not shown, can be employed to drive the carriage forward and rearward along the shelves and the horizontal slot.

In the construction shown there are two independent rotary plow feeder mechanisms 94, 96 mounted on the carriage with each mechanism including a rotor 98, 100 and having its own drive system 102, 104. The rotors 98, 100 each include a hub 106 and scraper or plow blades 108 secured to the periphery of the hub. The periphery of each hub is provided with upper and lower annular flanges 110, 112 with crossmembers 118 extending between and welded or otherwise affixed to these flanges. The scraper blades 108 extend radially out from the hub and comprise substantially arcuate scraper members 114 and substantially semicircular cover members 116 which are superposed on the scraper members. The cover members 114 are riveted, welded, or otherwise affixed at their innermost edge to the upper flange 110 of the hub while the innermost end of the scraper blades 108 are riveted, welded, or otherwise affixed to flanges 110, 112 and cross members 118. The scraper blades 108 pass over the shelves 28, a minimum clearance being allowed between the lower edge 120 of each scraper member and its respective shelf, and cooperate with the upper surfaces of the shelves to direct material from the shelves 28 to the chutes 76. The cover members 116 prevent the material from flowing over the top of the scraper members 114.

The drive systems 102, 104 comprise first and second drive trains 126, 128 and 130, 132, respectively, for driving the rotors during normal reclaiming operations and for pivoting the rotors to a selected position that determines the depth the rotor plow blades extend into the material on the shelf for commencing, adjusting, or terminating the feed of material from the shelf to the conveyor. While not shown in detail, it is to be understood that the components of the drive trains are covered at least in part by shields 66 which are welded or otherwise mounted on the carriage frame by conventional fasteners.

The first drive train of each rotary plow feeder mechanism includes a ring gear 134 and pinion 136 with the ring gear 134 serving as part of the hub of the plow feeder rotor. The ring gear 134 is connected with an outer annular hub member 138 by means of a circular metal plate 140 which is bolted by assemblies 142, welded, or otherwise affixed to the upper surface of the ring gear 134 and the upper edge of outer ring member 138 so as to position these members concentrically with respect to each other. The outer ring member is substantially L-shaped in transverse cross section and cooperates with a protruding annular portion of plate 140 to form flanges 110, 112 of the hub periphery to which the scraper blades 108 are affixed as previously set forth. In this manner when the internal ring gear 134 is rotated about its central axis of rotation x—x which extends perpendicular or substantially perpendicular to the plane of the shelf surface, the outer annular hub member 138 and scraper blades 108 are also rotated about the same axis of rotation.

As best shown in FIG. 4, the internal ring gear 134 meshes with and is driven by pinion gear 136 that is affixed to shaft 144 which rotates on an axis y—y eccentrically located with respect to the axis of rotation of the ring gear 134. The shaft 144 of the pinion gear is rotatably mounted within sleeve 146 of the second drive train by roller bearing assemblies 148, 150 or equivalent means and is coupled to the output shaft of a gear reduction unit 152 by a conventional coupling 155. The gear reduction unit 152 is driven by a conventional motor 154 and is provided with a conventional clutch assembly to permit rotation of the pinion relative to the motor when the rotor is being adjusted about axis y—y by the second drive train. Both the gear reduction unit 152 and the motor 154 are affixed to the carriage framework by conventional fastener assemblies.

The second drive train of each plow mechanism serves to adjust the depth to which the rotor blades extend into the material and includes an annular ring gear housing 156 which is interposed between the internal ring gear 134 and the external annular member 138 of the plow hub. Housing 156 includes upper and lower rings 158, 160 which are joined together by bolt assemblies 162 or equivalent fastening means. The rings 158, 160 each have inner peripheral flanges 162, 164 which cooperate with opposing annular grooves 166, 168 in the external concentric surface of the ring gear 134 to define raceways which carry bearings so that the ring gear 134 is rotatably carried within the housing 156. The outer surface of housing 156 which opposes the inner surface of the outer hub member 138 carries a suitable self-lubepacking or sealing means of a conventional nature which engages and cooperates with hub member 138 to prevent dirt, dust, and other undesirable matter from working its way into the roller bearing assembly.

The housing 156 is mounted on a circular support plate 172 by bolt assemblies 162. The plate 172 has an eccentrically located aperture therein which receives sleeve 146 of the drive train. The sleeve is welded or otherwise affixed to the support plate and tapered bracing spokes 174, extending radially out from the sleeve, are welded or otherwise suitably secured to the sleeve and the underside of the plate 172. The axis of rotation of the sleeve 146 coincides with the centerline y—y of the pinion gear drive shaft that is mounted within the sleeve on roller bearing assemblies 148, 150 and therefore rotation of the sleeve about axis y—y causes the rotor to pivot about this axis which is eccentrically located relative to the axis of rotation x—x of the rotor.

The sleeve 146 is rotatably carried within a mounting sleeve 176 of the carriage with the bearing assemblies or bushings 178, 180 that are interposed between the opposing concentric sleeve surfaces permitting rotation of the sleeve 146 relative to the mounting sleeve 176. The mounting sleeve 176 is provided with a collar 182 which is welded to the sleeve and bolted, welded, or otherwise rigidly affixed to the carriage framework 184 so as to provide a firm mounting for the rotor.

The sleeve 146 has an annular flange 186 welded or otherwise rigidly secured thereto which is utilized to couple the sleeve to a sprocket 188 by bolt assemblies 190. The sprocket 188 is driven by a drive chain 192 to pivot the ring gear housing about axis y—y. As best shown in FIG. 2, the drive chain 192 connects sprocket 188 to a sprocket 194 on the output shaft 196 of a conventional worm gear reduction unit 198 which is provided with a disc brake or other suitable braking mechanism on the input shaft. The gear reduction unit 198, in turn, is driven by a motor 200 or other conventional power source. While a conventional worm gear reduction unit is illustrated other conventional gear reduction units and locking mechanisms or brake assemblies to lock the drive train and consequently the rotor in a desired position relative to the storage shelf can be used.

In operation, the rotors are rotated in a reclaiming direction by drive trains 126, 128 while the carriage is slowly driven in either a forward or reverse direction along the length of the tunnel. The material reclaimed off the storage shelves fall through the guide chutes and onto the conveyor belt below. When used in the hold of the vessel the carriage would normally continuously traverse the total length of the cargo hold in order to keep the vessel on an even keel during unloading and reduce the ballast requirements. The speed of the rotors and the speed of the carriage can be varied in accordance with the characteristics of the material handled and the desired discharge rate. The discharge rate can also be regulated through drive trains 130, 132 by adjusting the depth that the blades extend into the material on the shelves. As the material is reclaimed from the storage shelves 28, the material in the cargo hold flows by gravity into the tunnel and comes to rest on the storage shelves. There is thus a continuous gravity feed of material from the cargo hold onto the storage shelves as the material is undercut by the rotors. In addition to facilitating the regulation of the discharge rate drive trains 130, 132 enable the rotors to be pivoted about eccentric axis y—y between a fully extended position for reclaiming (shown in solid line in FIG. 3) to a fully retracted position (represented in dashed line in FIG. 3). In the retracted position the rotor blades clear the material on the shelves and the carriage can be moved to any desired location along the shelves for storage or to commence the reclaiming operation once again.

While this specification described the preferred embodiment of one carriage having one rotary plow for each of two spaced storage shelves, it will be obvious that two or more rotary plows could be employed for each shelf and that two or more carriages could be employed in the tunnel at the same time. Likewise, the simplest form of the invention would entail having only one storage shelf at the bottom of the cargo hold and having a carriage with only a single rotary plow mechanism.

What is claimed is:

1. A rotary plow feeder assembly for reclaiming material from storage shelf comprising:
rotary plow means, said rotary plow means having hub means, and said rotary plow means having blade means carried by said hub means;
said hub means having ring gear means adapted to be rotated by drive means to effect rotation of said rotary plow means about a first axis of rotation for reclaiming, and said hub means having ring gear housing means for rotatably carrying said ring gear means;
and drive means for rotating said ring gear means about said first axis and for pivoting said ring gear housing means about a second axis offset with respect to said first axis to adjust said rotary plow means relative to a storage shelf.

2. In the rotary plow feeder of claim 1:
said drive means including pinion gear means meshing with said ring gear means to drive said ring gear means about said first axis.

3. In the rotary plow feeder of claim 2:
said pinion gear means having an axis of rotation coinciding with said second axis.

4. In the rotary plow feeder of claim 3:
said pinion gear means being positioned within said ring gear means.

5. In the rotary plow feeder of claim 3:
said first axis of rotation coinciding with the central axis of said rotary plow means.

6. In the rotary plow feeder of claim 1:
said ring gear housing means being annular, and said ring gear housing means and said ring gear being concentric with respect to each other.

7. In the rotary plow feeder of claim 6:
said ring gear housing means being intermediate said ring gear and an annular blade-carrying member affixed to said ring gear.

8. In the rotary plow feeder of claim 1:
said drive means including means for locking said ring gear housing means against pivotal movement about said second axis.

9. A reclaiming system comprising:
shelf means for holding bulk material;
a rotary plow feeder assembly for reclaiming material from said shelf means;
said rotary plow feeder assembly including rotary plow means, said rotary plow means having hub means, said rotary plow means having blade means carried by said hub means;
said hub means having ring gear means adapted to be rotated by drive means to effect rotation of said rotary plow means about a first axis of rotation for reclaiming, and said hub means having ring gear housing means for rotatably carrying said ring gear means;
and drive means for rotating said ring gear means about said first axis and for pivoting said ring gear means about a second axis offset with respect to said first axis to adjust said rotary plow means relative to said shelf.

10. In the reclaiming system of claim 9:
said shelf being inclined, and said first and second axes extending substantially perpendicular with respect to said shelf.

11. In the reclaiming system of claim 10:
means for effecting movement of said rotary plow feeder assembly along said inclined shelf.

12. In the reclaiming system of claim 10:
said drive means including pinion gear means meshing with said ring gear means to drive said ring gear means about said first axis.

13. In the reclaiming system of claim 12:
said pinion gear means having an axis of rotation coinciding with said second axis.

14. In the reclaiming system of claim 13:
said pinion gear means being positioned within said ring gear means.

15. In the reclaiming system of claim 14:
said first axis of rotation coinciding with the central axis of said rotary plow means.

16. In the reclaiming system of claim 15:
said ring gear housing means being annular;
and said ring gear housing means and said ring gear being concentric with respect to each other.

17. In the reclaiming system of claim 16:
said ring gear housing means being intermediate said ring gear and an annular blade-carrying member affixed to said ring gear.

18. In the reclaiming system of claim 17:
said drive means including means for locking said ring gear housing means against pivotal movement about said second axis.

* * * * *